United States Patent
Monteyne

(10) Patent No.: US 6,447,713 B1
(45) Date of Patent: Sep. 10, 2002

(54) ROTATING-HEARTH FURNACE FOR REDUCTION OF METALLIC OXIDES

(75) Inventor: Guido Monteyne, Lembeke (BE)

(73) Assignee: Sidmar N.V., Ghent (BE)

( * ) Notice: Subject to any disclaimer, the term of this patent is extended or adjusted under 35 U.S.C. 154(b) by 0 days.

(21) Appl. No.: 09/582,640

(22) PCT Filed: Jan. 28, 1999

(86) PCT No.: PCT/BE99/00013

§ 371 (c)(1),
(2), (4) Date: Jul. 28, 2000

(87) PCT Pub. No.: WO99/39013

PCT Pub. Date: Aug. 5, 1999

(30) Foreign Application Priority Data

Jan. 28, 1998 (EP) .............................. 98200242
Apr. 28, 1998 (EP) .............................. 98870097

(51) Int. Cl.⁷ .................................... C21B 13/08
(52) U.S. Cl. ......................... 266/177; 75/484
(58) Field of Search ............................ 266/177; 75/484

(56) References Cited

U.S. PATENT DOCUMENTS 3,383,199 A     5/1968   Schmidt
3,652,404 A  *  3/1972   Schilson ...................... 210/33
3,988,012 A  * 10/1976   Jemal ......................... 266/179
5,567,224 A    10/1996   Kundrat

FOREIGN PATENT DOCUMENTS

EP          0 692-543           1/1996

OTHER PUBLICATIONS

The Comet Process—DRI from fines and coal, Steel Times, vol. 224, No. 11, Nov. 1996, p. 399.

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A method for improving the direct reduction of metal oxides in a continuous furnace with a rotating hearth. The method deposits two or several layers with increasing metal oxide contents in each layer towards a top loading surface and decreases carbon contents towards the top loading surface, which carbon will be preheated to a temperature of the order of 200° C. while the metal oxides will be preheated to a temperature of 800° C. The furnace is provided with equipment producing at the loading surface triangular grooves and in first and second zones of the furnace matching equipment with double action.

9 Claims, 3 Drawing Sheets

ROTATING-HEARTH FURNACE FOR REDUCTION OF METALLIC OXIDES

TECHNICAL FIELD

The present invention relates to an improved method for the direct reduction (generally producing what is described as DRI) of metallic oxides, particularly iron oxides, by coal making it possible to achieve a higher productivity and a lower specific consumption of coal. It also relates to an installation for implementing the method and to the metallic sponge capable of being produced.

1. Disclosure of the Invention

The invention aims firstly to increase the reaction rates by a mixing of the charge, by an increase in the efficiency of the radiation from the furnace and by an increase in the surface area for heat exchange with the furnace atmosphere, and secondly to use the reducing capacities of the volatile constituents of the coal more efficiently by their forced passage into a layer of preheated metallic oxides. Together, these operating conditions should also lead to a considerable increase in the production capacity per unit surface area and to a reduction in the production of carbon dioxide discharged into the atmosphere per unit quantity of the reduced metallic oxides obtained.

The invention also has as its objective the discharge of less dust to the gas treatment plants thanks to a control over the speed of these gases while keeping the volume of the furnace to a minimum.

The invention also aims to produce a metallic sponge having, in bulk, a better homogeneity in the degree of reduction compared with products resulting from known techniques.

2. Background Art

The direct reduction of metallic oxides, particularly of ores but also of various recycled metallic oxides, has developed considerably in recent years.

A method for producing an iron sponge with a low sulphur content is described in the document EP-0 692 543-A1.

This document indicates that a non-preheated charge is placed on a mobile hearth, the said charge consisting of superimposed layers of finely divided materials, at least one of the layers consisting mainly of iron oxides and at least one other layer being formed by a mixture of a solid carbonaceous reducing agent and a desulphurising agent. The iron oxides are mainly reduced by means of carbon monoxide from the coal, the volatile constituents of the coal taking part only partially in the reduction of the iron oxides.

Similarly, in the production of iron sponges from pellets formed from a mixture of iron oxides and coal, the iron oxides are reduced principally by means of the carbon monoxide from the coal, the volatile constituents of the coal taking part only partially in the reduction process.

A method is described in the document LU-60981-A (Société Anonyme des Minerais) for producing an iron sponge comprising the use of a continuous rotating-hearth reactor with a displacement of the material from the side to the centre, first supplied with coal alone and then with iron ore, in pellet form or broken up, preheated to the reaction temperature. Fixed scrapers cause a movement of the coal towards the centre at each rotation. After other scrapers have been used to produce a fairly thorough mixing of the heavily coked carbonaceous source and the preheated iron ore, the charge is discharged through a central shaft. The distillation gases from the coal and the reaction gases are partly or completely burnt by heating the solid materials moving in the reactor before being discharged with the entrained fine particles towards a collector located above the reactor.

This method (which is not illustrated by any drawings) does not include efficient means for the best possible use of the reducing properties of the volatile constituents of the coal, the latter being used mainly for their heating capacity by combustion outside the reaction field. Moreover, the formation of the charge by superimposed layers of materials not mixed beforehand and the use of scrapers moving the whole of the charge each time do not enable a high degree of uniformity in the charge to be obtained, either in material or in temperature, nor does it lead to a high productivity.

A method is described in the document U.S. Pat. No. 5,567,224-A (Kundrat) for producing an iron sponge in a rotating-hearth furnace using an oxidising flame located just above the upper surface of the hearth. A mixture of metallic oxides and a carbonaceous reducing agent is placed on the hearth, the said mixture passing in front of the burners during the rotation of the hearth. A second layer of the reducing agent is then charged and the heating is continued. No arrangement for stirring and/or mixing the material is provided for. The discharge takes place towards the periphery and is achieved using an Archimedean screw.

A method is described in the document U.S. Pat. No. 3,383,199-A (Schmidt) for producing an iron sponge by supplying the materials on a conveyor belt in several layers, without any indication of the means for carrying out the mixing of the constituents of each of the different layers within the layer or the mixing of the different layers with each other.

A method is described in the document U.S. Pat. No. 3,770,417-A (Kranz) for the production of an iron sponge at the same time as the production of coke based on the use of a distillation chamber placed above a heated and perforated mobile hearth. The coal, after distillation, is added to a charge of oxides in the form of a second layer in order to bring about the reduction. Scrapers mounted in the roof of the reactor stir the material and may be used to discharge it towards a central exit.

A method is described in the document U.S. Pat. No. 3,475,286-A (Kemmerer) for producing an iron sponge based on the use of a rotary furnace with a conical hearth provided with fixed scrapers mounted in the roof of the reactor, which move the material towards the centre. Provision is made for arranging the scrapers in such a way that the thickness of the bed of materials on the hearth is kept constant.

The document "The Comet Process—DRI from fines and coal" published in Steel Times, vol. 224, no 11, November 1996, page 399 describes the principle of a rotating-hearth furnace developed by the Applicant in collaboration with the Center for Metallurgical Research in Liege (Belgium).

All the methods described in these documents have the same disadvantages as those mentioned in connection with the above patent LU-60981-A, i.e. the volatile constituents of the coal participate only partially in the reduction of the metallic oxides and the methods do not make it possible to obtain a high productivity or a high degree of uniformity as regards the temperature and the material of the charge.

Characteristic Elements of the Invention

The invention relies on the observation that, in most of the methods of the present state of the art, a major part of the volatile constituents of the coal, particularly the hydrogen and the methane, are not used for their reducing capacity, this reduction being mainly carried out by carbon monoxide, whose reduction kinetics are significantly less favorable than those of hydrogen. It therefore seems that it would be particularly advantageous for the aforesaid volatile constituents to be progressively released and, by their forced passage through a layer containing the metallic oxides, for them to be put into contact with the metallic oxides under operating conditions (in particular, as regards the temperature of the metallic oxides and the successive mixtures of reagents) such that they participate in the reduction of the latter. This implies that the metallic oxide and the released reducing gases are put into contact at temperatures as high as possible, but without upsetting the progress of the reduction process. To achieve this, the coal will be preheated to a temperature of the order of 200° C., while the metallic oxides will be preheated to a temperature of the order of 800° C., both constituents being preheated by means of heat recovered from the discharged combustion gases using the same heat exchangers.

The invention concerns an improved method for the direct reduction of metallic oxides in a continuous rotating-hearth furnace, characterized in that, on a part called the charging zone of the hearth over a width of the ring, which depends on the diameter and the capacity of the furnace, two or more layers are deposited which have concentrations of metallic oxides per layer that increase towards the upper surface of the charge and concentrations of coal, particularly of coal with a high concentration of volatile constituents, that decrease towards the upper surface of the charge, said coal being preheated to a temperature of the order of 200° C. while the metallic oxides are preheated to a temperature of the order of 800° C., both constituents being preheated by means of heat recovered from the discharged combustion gases using the same heat exchangers, in order to take the coal rapidly to a temperature at which the volatile constituents are released and, under the effect of the volatile constituents, particularly hydrogen, released in this way, in order to carry out the reduction of the preheated metallic oxides at a temperature sufficient to initiate the reduction reaction, the entrance to the furnace being provided with equipment creating triangular furrows in the surface of the charge, and the first zone of the furnace being provided with additional dual-action equipment making it possible, by a first action in which the peaks are levelled off, to prevent the peaks of each furrow, which are very rapidly heated, reaching the temperature of agglomeration, which would make their mixing with the charge more difficult, the levelled-off part being taken into the hollows of the furrows and, by a second action, to achieve a levelling off of a face of each furrow as far as its base, the levelled-off part being pushed on to a face of the adjacent furrow and covering the material brought by the first action, and thanks to which the charge is progressively mixed at increasingly deep levels and is moved radially as the hearth rotates, the base of the furrows being moved at the end of each revolution of the charge radially in one or more stages through a total distance corresponding to the width of each charging zone, and the second zone of the furnace being provided with dual-action equipment making it possible, through a first action of levelling off the peaks, to prevent the peaks of each furrow, which are very rapidly heated, reaching the temperature of agglomeration, which would make the mixing more difficult through the effect of segregation, the levelled-off part being pushed into the hollows of the furrows, and through a second action to level off a face of each furrow down to the hearth, the levelled-off part being pushed on to a face of the adjacent furrow and covering the material brought by the first action, the charge being moved radially as the hearth rotates to be discharged after several revolutions, preferably after 4 or more revolutions, towards the part of the ring opposite the charging zone.

In a particular application, the layer of the mixture of metallic oxides and coal and the layer of metallic oxides consists of a layer of pellets including these constituents.

The following description will refer to the general term "metallic oxides". This term embraces the usual metallic ores, recycled metallic oxides originating from iron and steel-making processes, for example from blast furnaces, steel plants, electric furnaces or rolling mills, as well as a mixture of these sources of oxides with coke fines or with coal, if necessary in the form of pellets.

Coal is to be understood to mean any solid carbonaceous material.

In the first and second zones of the furnace, the operating conditions are chosen in such a way as to achieve a compromise between, firstly, the need to produce a high and uniform temperature of the charge as quickly as possible and, secondly, the need to put progressively in contact with the layer of metallic oxides or the upper layer of the mixture of metallic oxides and coal only the upper part of the underlying layer of coal, avoiding incorporating in it the cooler lower layers, so that the temperature of the new mixture thus obtained is above 600° C., in particular of the order of 700° C.

The rotational speed of the hearth may lie between 3 and 12 revolutions per hour. It is preferably 8 revolutions per hour.

Moreover, as regards the upper layer of the charge, it is essential to avoid this being vitrified, for example by the formation of silicates of the fayalite type that have an inhibiting effect on the reduction. For this purpose, means such as rabbles ensure a rapid mixing of the surface layer in the layer immediately below.

The final aim is of course to obtain, in a production time as short as possible, for a thickness of charge of the order of 5 to 10 cm, the production time being determined by the coldest point in the charge, a metallic sponge with a better homogeneity than the sponges produced by reduction methods of the present state of the art, the latter generally having the drawback that they yield a product in which the metallic oxides are reduced by varying degrees.

It has been found advantageous to mix some lime with the metallic oxides, firstly because said lime acts as a catalyst for the reaction and secondly because it prevents phenomena of adhesion in the metallic sponge. In addition, the lime generally contributes to desulphurisation of the pig iron and to the formation of a more fluid slag or clinker.

Description of a Preferred form of Execution of the Invention

According to a preferred form of execution, provision may be made for the following:

the charging is carried out in the inner contour of the ring, the small circle, preferably over $\frac{1}{8}$ to $\frac{1}{12}$ of the width of the ring, the material which undergoes 4 or more complete revolutions, depending on the charging conditions over the width of the ring, is turned over up to 100 times by rabbles provided with blades of different shapes and functions depending on the zone of the furnace as described above, at each blade, the charge is moved radially outwards, the charge thus describing a roughly helical path, discharging is carried out over the outer part of the ring by means of one or two worm conveyors having a length corresponding respectively to the width or to half the width of the charging, burners are placed on the walls at the sides of the ring, mainly on the outer walls of the ring, on the large circle, the gases are discharged by flowing in a direction opposite that of the movement of the materials through the walls on the inner sides of the ring, on the small circle.

On the rabbles, the dual-action blades with different dimensions and shapes are so arranged that the blades in the first zone progressively level off the charge at increasingly deep levels down to the base of the furrows, while the blades in the second zone, where the charge is still not agglomerated and is still easily mixable, have an appropriate shape different from that of the first blades and they level off the furrows and their base. This prevents the appearance, on the surface of the charge, of a sheet of reduced metallic oxides that is too thick, strong, difficult to break up and difficult to discharge.

The advantages are mainly a more uniform reduction of the charge, a simpler charging installation, easier discharge and a more effective control over the furnace atmosphere by a better control of the gases in the furnace.

The rabbles are fixed and are placed radially in the furnace, the first rabble being located in the charging zone, i.e. the zone in which the furnace is supplied with material.

The blades of the rabbles are fixed and offset, i.e. arranged in a slightly staggered fashion with respect to the furrows formed by the blades of the preceding rabble, by 50 mm for example, so as to level off a sloping side of each furrow. The movement of the material on the hearth causes mixing (i.e. stirring) and the formation of a new furrow. The blades create triangular furrows over the whole surface of the charge and this increases the surface area of the charge at the interface with the furnace atmosphere by about 35%, thus producing a greater heat transfer from the furnace to the charge.

The first and second types of dual-action blades are designed so that, at each passage through the charge, a part of it is turned over, the upper layer of the charge in contact with the furnace atmosphere, initially consisting of metallic oxides, and then of the mixture of metallic oxides and coal and finally of reduced metallic oxides, descending while the underlying layer is raised.

The end of each of the blades is shaped in such a way as to turn the material over so that the topmost part of the furrow, the hottest part, is moved to the trough of the newly created furrow, in order to ensure better homogenization.

Said end may, if desired, be cooled (by the internal circulation of a cooling liquid, for example).

The rabbles may be distributed linearly in the different zones of the furnace over the length of the passage in a zone of the furnace. It will preferably be made non-linearly and will be dependent on the surface temperature and on the temperature gradient in the charge.

The amount of coal is determined by the stoichiometric quantity necessary to bring about the complete reduction of the metallic oxides present, reduced by an amount corresponding to the reducing action of the volatile elements, and possibly increased by an amount necessary for melting the sponge and for subsequent alloying.

The progressive mixing of the layer of metallic oxides with the underlying layer, whose temperature is necessarily higher in the zone near to the interface between the metallic oxides and the coal than in the more distant layers, has the following consequences:

a greater heat transfer through an increase in the surface area at the interface between the upper layer and the furnace atmosphere;

the higher thermal conductivity of the layer of metallic oxides, initially present in a single layer at the upper part of the charge and afterwards progressively in the mixture, contributes to a better heat transfer than that in methods with multiple layers, without the reducing agent, in this case coal, which is a poorer conductor of heat, disturbing the process;

the progressive mixing of the layers forming the charge enables a uniformity of the temperature throughout the charge to be rapidly achieved;

the metallic oxides very rapidly reach the high temperatures where their reactivity is greater, which increases the efficiency of the reduction process and reduces the operational time;

the volatile constituents released progressively and generated by the coal taken progressively to higher temperatures are used efficiently and directly as a reducing agent;

the reduction using hydrogen occurs immediately and is optimised, which enables advantage to be taken of the fact that its reaction kinetics are better than those of CO gas;

the reduction by CO is rendered more efficient because the hotter upper layer is progressively mixed with the layer immediately below taken to an adequate temperature and not with the deeper layers that are still too cool;

in principle, it becomes possible to produce less carbon dioxide per unit mass of the reduced metal produced;

surface temperatures that are too high are avoided and hence there is no production of fayalite;

the appearance on the surface of the charge of a sheet of reduced metallic oxides that is too thick, strong, difficult to break up and difficult to discharge is prevented;

the furnace, for a given production, will be less bulky than that in other methods, for example in those working with a multi-layered charge or a charge consisting of a single layer of pellets, for example.

In principle, the reducing agent is coal with a high concentration of volatile constituents, preferably with a concentration of volatile constituents greater than 25%.

The furnace is generally maintained at a dome temperature of the order of 1300 to 1450° C., preferably of the order of 1400° C., by burners installed in the outer walls of the mobile-hearth furnace and with post-combustion in the inner part of the ring.

The successive mixing of the upper layers with the underlying layers means that the maximum surface temperature reached does not exceed 1100 to 1200° C.

The methods used also make it possible to increase the homogenisation of charges consisting of pellets, which contributes to a considerable increase in the thickness of the charge, to a faster and more efficient operational cycle, to a more compact furnace and to an optimisation of heat exchanges.

BRIEF DESCRIPTION OF THE FIGURES

The invention will be described with reference to a preferred form of execution of the invention illustrated in the appended drawings.

Description of a Preferred form of Execution of the Invention

Figure 1:
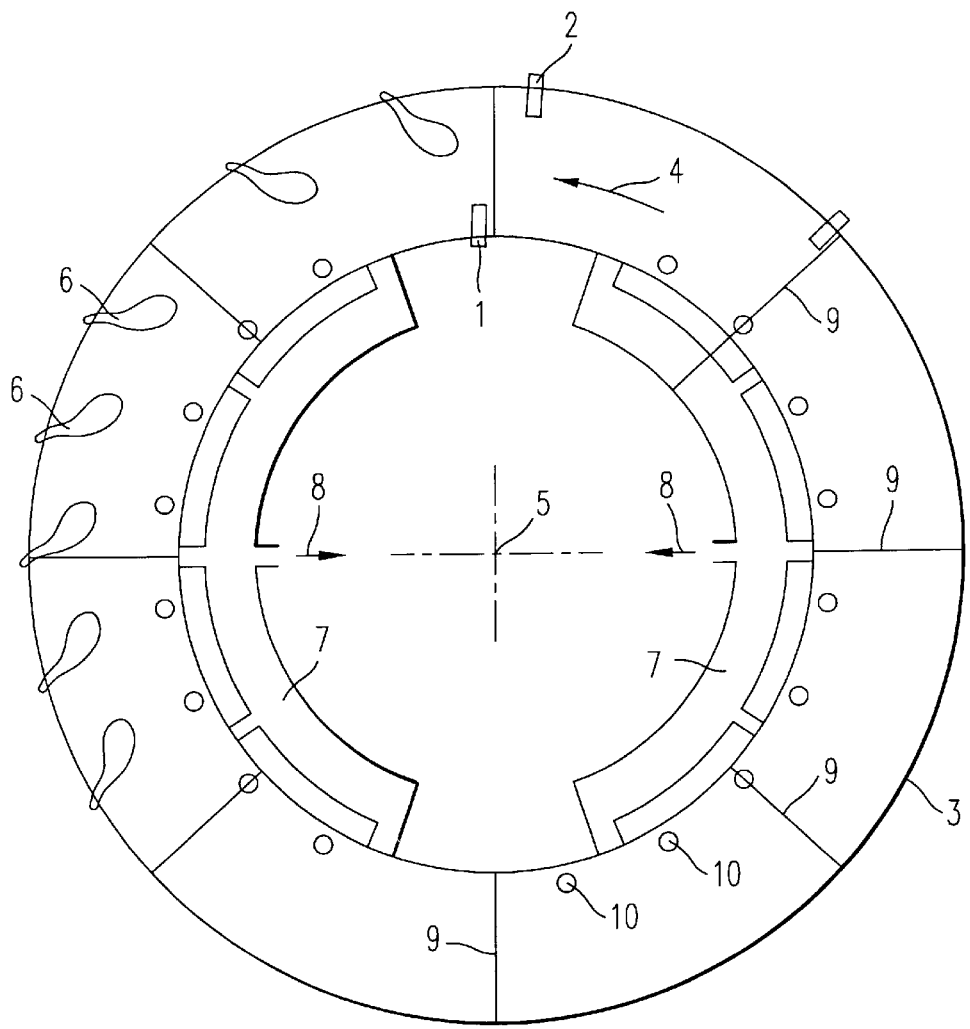
FIG. 1 shows a diagrammatic horizontal projection of a rotary furnace with a distribution of rabbles in a rotary furnace.

The operational principle of the method is illustrated in FIG. 1.

In FIG. 1, the charging zone is illustrated at 1 and the zone for discharge from the rotating hearth 3 is illustrated at 2, said hearth executing a movement in the counter-clockwise direction represented by the arrow 4 about the furnace axis 5. The burners fixed in the outer wall of the furnace are represented at 6, the combustion gases are extracted through the inner walls of the furnace at 7 and are sent to heat exchangers through openings 8. The rabbles supporting the blades are referred to by the reference number 9, while the oxygen injectors are referred to by the reference number 10.

Figure 2:
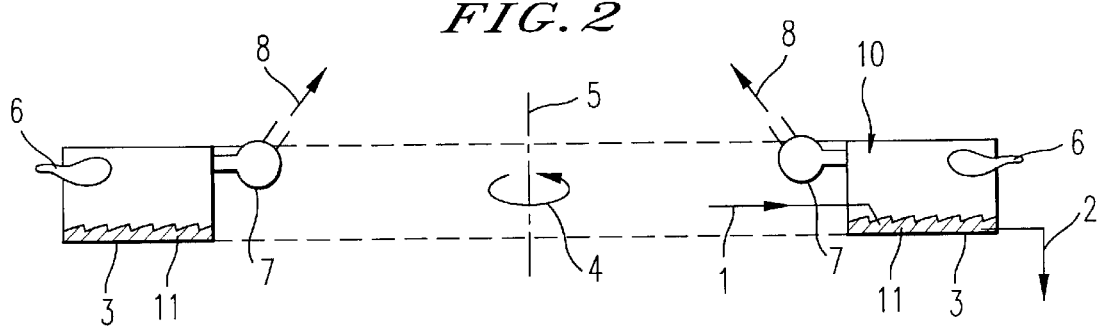
FIG. 2 shows a vertical projection of a section through the rotary furnace.

The same reference numbers as in FIG. 1 are used in FIG. 2. The reference number 11 denotes the charge.

Figure 3:
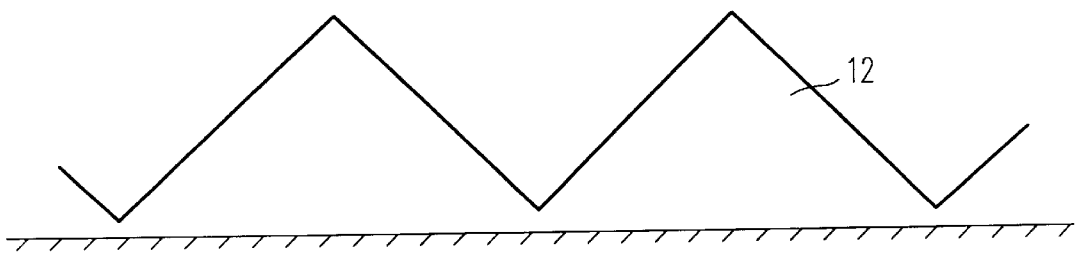
FIG. 3 shows the furrows formed during the charging.

FIG. 3 shows the furrows 12 formed during the charging.

Figure 4:
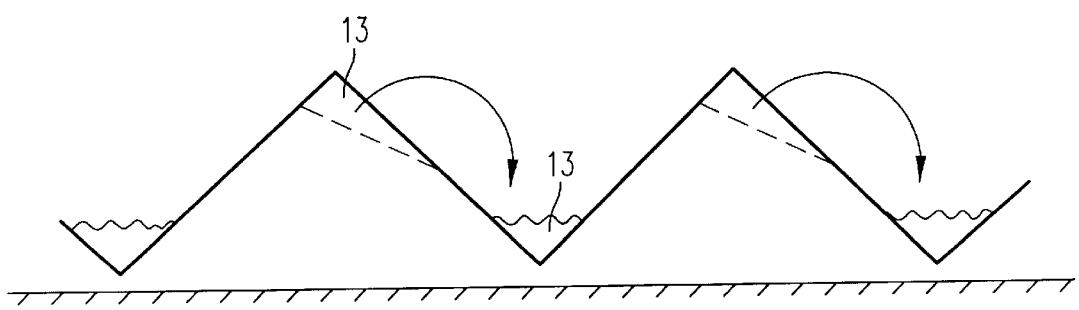
FIG. 4 shows the furrows in the charge resulting from the first action of the blades, located on fixed rabbles.

FIG. 4 shows the levelling off of the peaks 13 of the furrows resulting from the first action of the blades.

Figure 5:
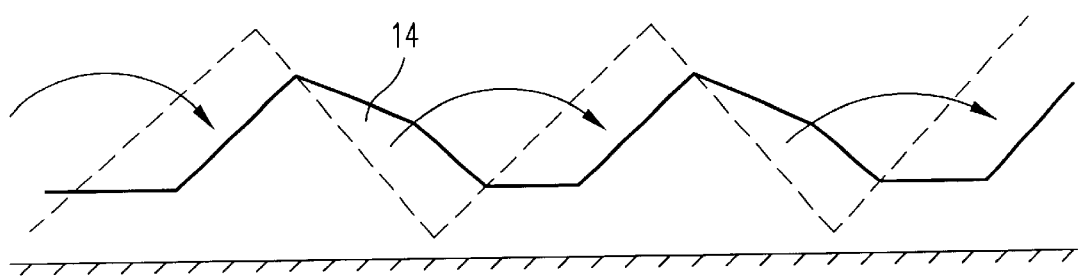
FIG. 5 shows the furrows in the charge resulting from the second action of the blades, located on fixed rabbles.

FIG. 5 shows the levelling off 14 of the furrows resulting from the second action of the blades.

Figure 6:
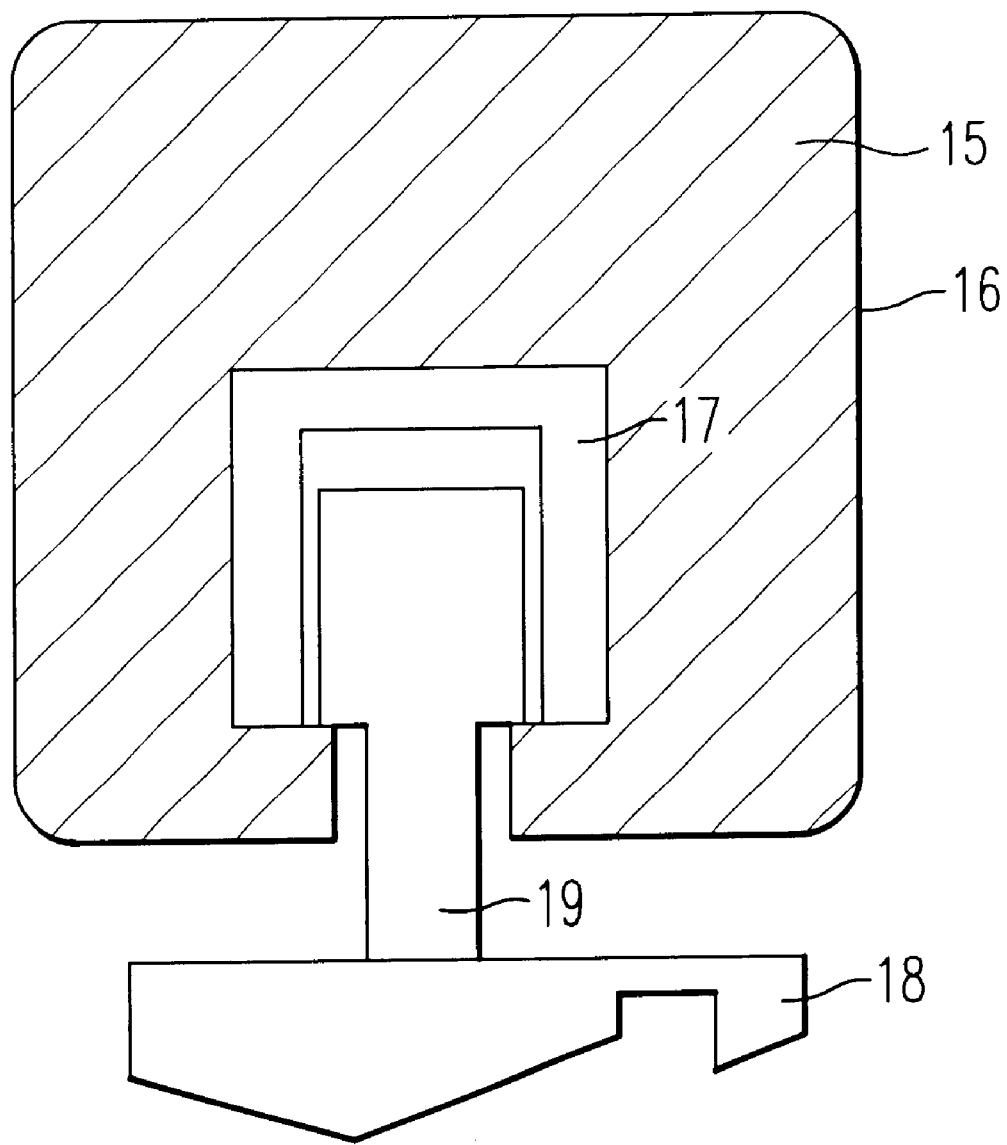
FIG. 6 shows a diagrammatic view of a vertical projection of a section through a rabble and a blade with an arm fixing it to the rabble.

FIG. 6 shows a diagrammatic view of a vertical projection of a section through a rabble 15 with its external thermal insulation 16 and an inner water-cooled chamber 17 together with a blade 18 having an arm 19 fixing it to the rabble.

What is claimed is:

1. Rotating-hearth furnace for the reduction of metallic oxides comprising:
    a ring-shaped rotating hearth subdivided into:
        a charging zone,
        a first zone adjacent to the charging zone,
        a second zone adjacent to the first zone and
        a discharge zone adjacent to the second zone,
    the charging zone comprising a device for depositing a charge with one or more layer of a mixture of metallic oxides and coal and equipment for forming on a surface of the deposited layer furrows having a substantially triangular section so as to obtain a substantially sawtooth-shaped surface,
    the first zone of the furnace and the second zone comprising blade equipment for leveling off the peaks of the sawteeth, a levelled-off part of the peaks being pushed into the hollows of the furrows and, by a second action, to level off one face of each saw tooth, the levelled-off part being pushed on to a face of the adjacent sawtooth so as to cover the material pushed by the first action, and displacing the mixture radially as the hearth rotates, said equipment of the first zone and second zone comprising respectively, first and second dual action blades such that upon each passage through the charge, a part of the charge is turned over, such that an upper layer of the charge initially comprises metallic oxides, then a mixture of metallic oxides and coal, and finally comprises reduced metallic oxides wherein the successive mixing of the parts of the charge limit the maximum surface temperature thereof to a temperature less than or equal to 1200° C.

2. The furnace according to claim 1, which comprises one of a worm conveyor and a deflector for carrying a discharge out over a part of the ring.

3. The furnace according to claim 1, which comprises means for progressively stirring upper layers and underlying layers of the charge so as to successfully mix the upper layers of the charge with the underlying layers.

4. The furnace according to claim 1, wherein said first and second dual-action blades comprise teeth portions of first and second ravels, respectively, said ravels being fixed and arranged radially in the furnace.

5. The furnace according to claim 1, wherein the ravels located in the first zone comprise blades penetrating the layer of the charge up to a base of the sawteeth for displacing the mixer radially towards the discharge side of the ring.

6. The furnace according to claim 1, wherein the ravels located in the second zone comprise blades for penetrating the layer over an entire depth portion thereof, and for displacing the mixture radially towards the discharge side of the ring.

7. The furnace according to claim 1, wherein the blades are offset from one another by being arranged in a slight staggered fashion with respect to the furrows worn by the blades so as to level off one sloping side of each furrow and thus form a new furrow.

8. The furnace according to claim 1, wherein the blades are adapted to continuously turn the charge over until discharge thereof from the furnace.

9. The furnace according to claim 1, which comprises a plurality of burners positioned on an outer wall portion of the furnace for maintaining a temperature in the furnace so as to be in the range of 1300 to 1450° C. at a dome portion of the furnace.

* * * * *

UNITED STATES PATENT AND TRADEMARK OFFICE
CERTIFICATE OF CORRECTION

PATENT NO.   : 6,447,713 B1
DATED        : September 10, 2002
INVENTOR(S)  : Monteyne It is certified that error appears in the above-identified patent and that said Letters Patent is hereby corrected as shown below:

<u>Title page,</u>
Item [73], should read:

-- [73] Assignee: Sidmar N.V., Gent (BE) --

Signed and Sealed this

Fourteenth Day of January, 2003

JAMES E. ROGAN
*Director of the United States Patent and Trademark Office*